Oct. 13, 1964 R. H. BEGEMAN ETAL 3,153,234
FIXED ANTENNA TERRAIN CLEARANCE SYSTEM
Filed Dec. 17, 1958 2 Sheets-Sheet 2
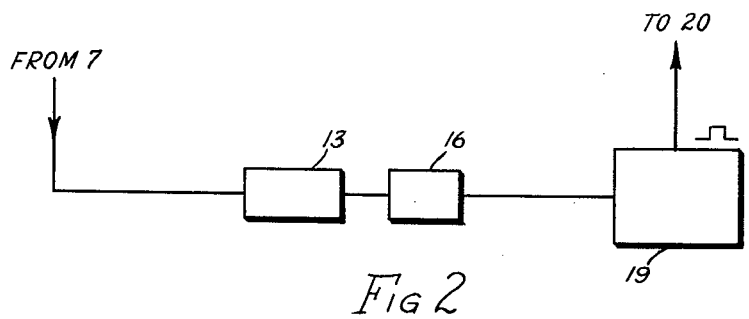
Fig 2
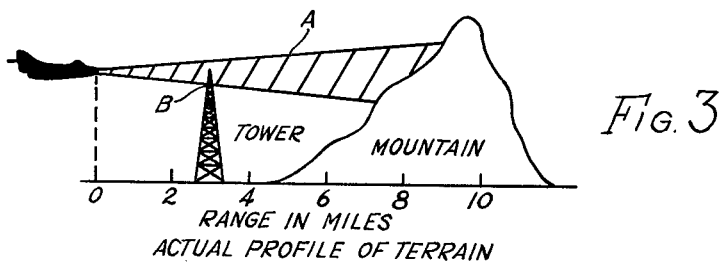
Fig. 3
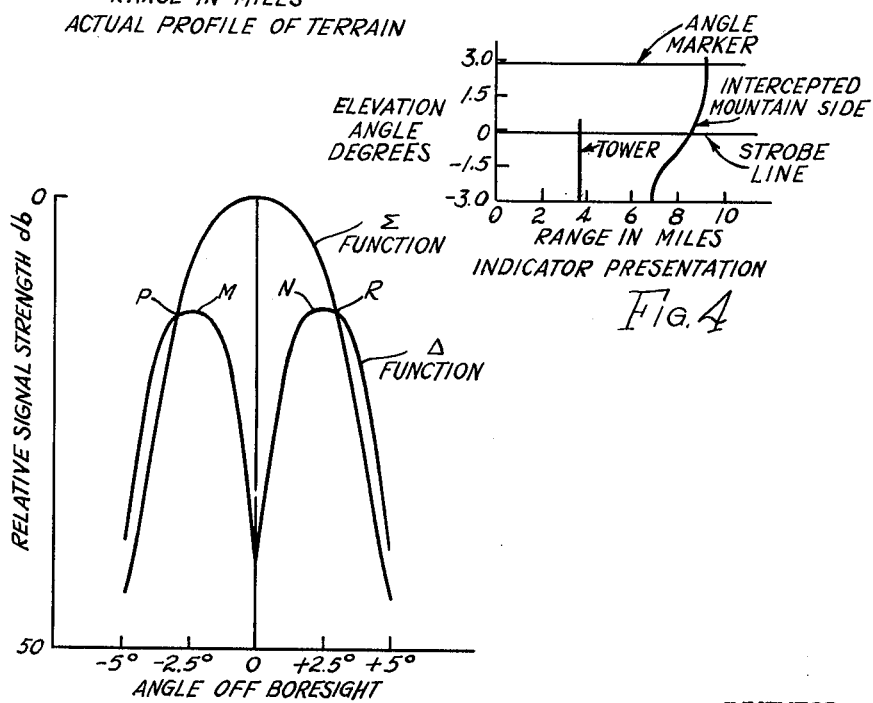
Fig 4
Fig 5
INVENTOR.
ROBERT H. BEGEMAN
FRANCIS A. MARASCO
BY
H. H. Losche
ATTORNEYS A typical A-scope circuit is shown

United States Patent Office 3,153,234
Patented Oct. 13, 1964

3,153,234
FIXED ANTENNA TERRAIN CLEARANCE SYSTEM
Robert H. Begeman and Francis A. Marasco, Indianapolis, Ind., assignors to the United States of America as represented by the Secretary of the Navy
Filed Dec. 17, 1958, Ser. No. 781,170
12 Claims. (Cl. 343—16)
(Granted under Title 35, U.S. Code (1952), sec. 266)

The invention described herein may be manufactured and used by or for the Government of the United States of America for governmental purposes without the payment of any royalties thereon or therefor.

This invention relates to radar systems generally and particularly to systems having a fixed antenna and used in terrain clearance applications.

Heretofore, equipment useful for obstacle detection or terrain clearance in an aircraft has usually involved antenna mechanism mounted in the aircraft using some type of mechanical arrangement to provide a scanning function in elevation and, in some instances, also scanning in azimuth. Because mechanically actuated antennas naturally require mechanism with its attendant weight and space requirements, and subject the system to errors due to mechanical tolerances and inertias, it is apparent that a system for obstacle detection and terrain clearance, using a fixed antenna, is desirable.

The present invention employs in an aircraft a fixed antenna having its boresight line parallel to the aircraft air mass velocity vector, and produces, on an indicator screen, a presentation representative of obstacles or terrain profile interrupted by the radar beam in the path ahead of the aircraft. While various types of presentation may be used, that most frequently used is the "A" scope type in which the presentation indicates the angle (within limits approximately equal to one beamwidth) above and below the boresight which the obstruction or terrain covers. It also indicates the range to the obstruction or terrain.

To provide an accurate representation of the angular location of the obstruction relative to the antenna boresight, the radar system employs phase comparison. The antenna used in a typical embodiment of applicants' invention may be of the general type of amplitude comparison antennas well-known in the art as evinced by U.S. Patent 2,682,656 which issued to R. S. Phillips on June 29, 1954. That patent discloses in FIGURE 1 thereof a directive radio system utilizing an antenna having a single reflector and a pair of feeds offset from the boresight axis. Applicants' device employs such an antenna to obtain echo signals in elevation, and the signals are combined as in a conventional amplitude monopulse system. However, a 90° phase shift is effected in the difference channel as a basis for phase comparison. Then the sum and difference signals are added and subtracted in a hybrid circuit, the output of which is fed to limiting I.F. amplifiers having identical transfer characteristics in both phase and output level. These amplifiers avoid erroneous angle representations at the indicator, which variations of target radar cross-section and range would otherwise cause. The I.F. amplifier output goes to a phase detector, the output of which represents the elevation angle with respect to the boresight from which the echo has returned. The phase detector output is then fed to an angle deflection amplifier, the output of which is connected to the indicator screen.

An angle gate channel is provided according to the present invention to restrict the presentation on the indicator screen to one representing obstructions or terrain existing in the primary portion of the antenna beam, thereby excluding presentations which might otherwise result as ambiguous returns from the outer extremities of the main lobe or from side lobe effects.

An angle marker circuit is provided to produce on the indicator screen a presentation representative of a known angle from the antenna boresight.

It is accordingly a general object of the present invention to provide a radar system useful for detection of obstructions in the path of an aircraft and for providing a profile terrain clearance indication for an aircraft flying in mountainous areas or in the vicinity of man made obstructions.

It is a more specific object of the present invention to adapt a monopulse radar system using a fixed antenna to obstacle detection and terrain clearance.

Other objects and advantages of this invention will become apparent when the description which follows is studied along with the several figures of the drawing in which:

FIGURE 2 shows a second embodiment of the angle gate channel;

FIGURE 3 shows a typical actual terrain profile which may be encountered by an aircraft;

FIGURE 4 shows a presentation such as would be shown by the indicator of an aircraft using the present invention and encountering a terrain situation as shown in FIGURE 3; and FIGURE 5 shows curves representative of the sum of, and difference between, signals returning from various locations in the radar beam.

Figure 1:
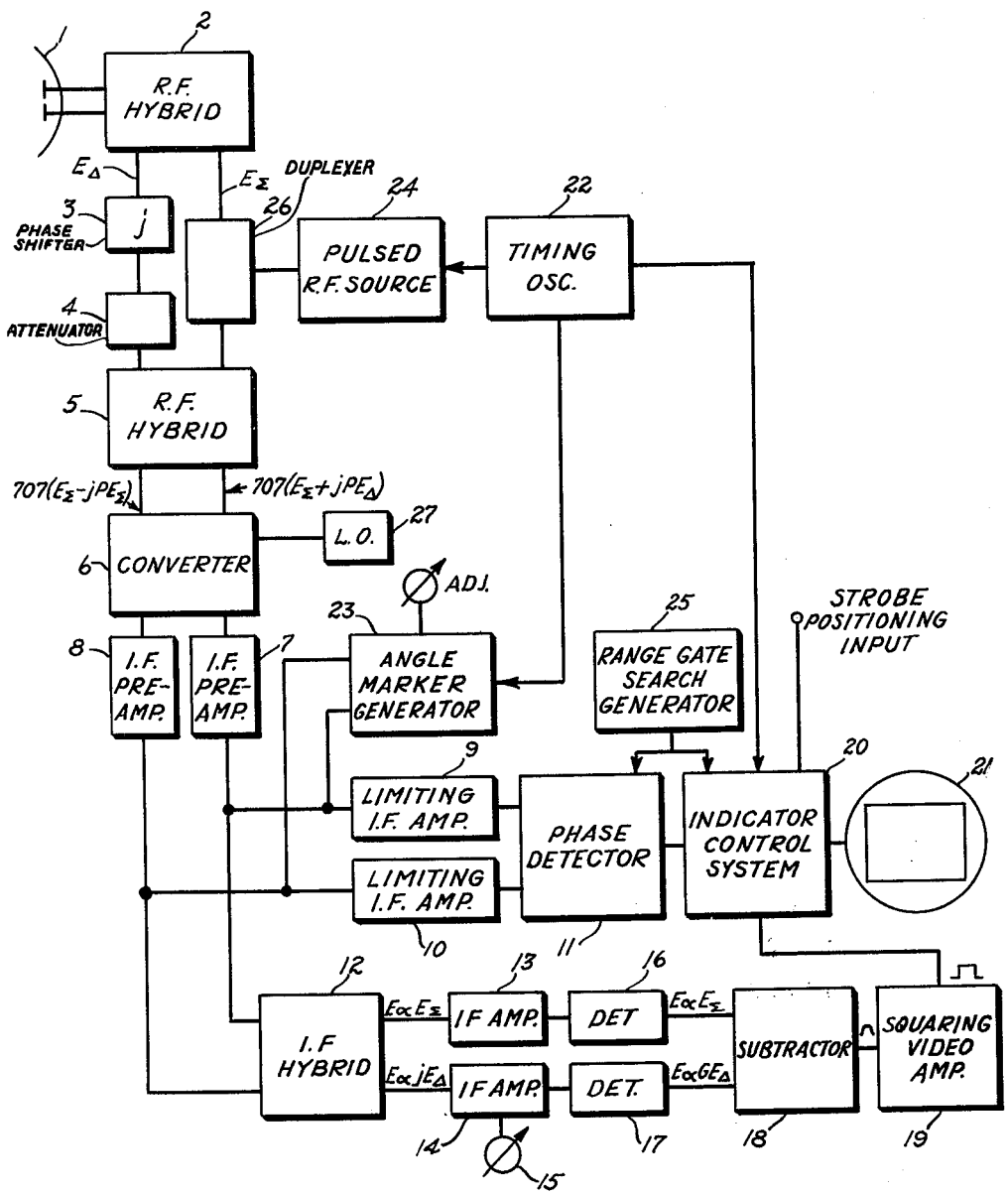
FIGURE 1 shows in block form the system of the invention.

Referring to FIGURE 1, antenna 1, having a two-channel feed, is coupled to an R.F. hybrid 2. From the hybrid 2 there are a sum and a difference channel output coupled to a duplexer 26 and a phase shifter 3, respectively. Phase shifter 3 is coupled to attenuator 4. Duplexer 26 is coupled to a source 24 of R.F. pulses for transmission, which is coupled in turn to a timing oscillator 22 in conventional manner. Duplexer 26 and attenuator 4 are coupled to R.F. hybrid 5, for addition and substraction, of the R.F. signals. Hybrid 5 is coupled to mixer 6 which is coupled in turn to I.F. preamplifiers 7 and 8. The outputs from I.F. preamplifiers 7 and 8 are coupled to limiting I.F. amplifiers 9 and 10. The output of these amplifiers is fed to phase detector 11 which produces the necessary angle deflection signal. That portion of the system beginning with the limiting I.F. amplifiers may be termed the angle information detection channel.

According to the present invention, there is coupled to the I.F. preamplifiers 7 and 8 another channel called the angle gate channel. This includes I.F. hybrid 12 to obtain sum and difference I.F. signals, to which hybrid are coupled I.F. amplifiers 13 and 14 which are coupled in turn to amplitude detectors 16 and 17, respectively, to produce video signals. Detectors 16 and 17 are coupled to subtractor 18 to produce a video angle gate signal representative of the difference between the sum and difference signals. The output of subtracter 18 is coupled to squaring video amplifier 19 for shaping the angle gate signal for the purpose of video limiting. The outputs of both the angle information channel and the angle gate channel are coupled to an indicator control system 20, where the angle gate signal provides intensity modulation of the beam of an indicator 21, usually an oscilloscope, and the angle deflection signal is amplified and provides the vertical deflection of the beam. The indicator control system is conventional and where the desired presentation is of the A-scope type, for example, it may be any of those well-known in the art for providing an A-scope presentation. A typical A-scope circuit is shown at page 314 of a book entitled "Principles of Radar," by the Massachusetts Institute of Technology Radar School Staff.

Also connected to the indicator control system 20 is timing oscillator 22 for triggering a conventional range sweep circuit therein.

Angle marker generator 23 is coupled to timing oscillator 22 and to the limiting I.F. amplifiers 9 and 10 to cause a presentation on the screen of indicator 21 representing a known angle off boresight.

In one variation of our invention, a range gate search generator 25 is coupled to phase detector 10 and to indicator control system 20 for a purpose to be described later in this specification.

There is also a strobe input coupled to indicator control system 20 for presenting on the indicator 21, a line indicative of horizontal.

*Operation*

In operation, R.F. energy, originating in source 24, is transmitted from both feeds of antenna 1, in the same phase producing a single beam of wave energy along the boresight axis, as shown by the symbol A in FIGURE 3. Taking, for example, the point B in FIGURE 3, a point on the tower, echo signals are returned therefrom. These echo signals return to both the upper and lower feeds of the radar antenna but, because the feeds are disposed above and below the boresight line of the antenna, the magnitude of the signal entering the upper feed differs from that entering the lower feed. The signals from the upper and lower feeds are added and substracted in R.F. hybrid 2 to obtain sum $\Sigma$ and difference $\Delta$ signal voltages, as in a conventional amplitude comparison monopulse system. The voltages, $E_\Delta$, resulting from difference signals then go through phase shifter 3 which effects a 90° phase shift, necessary for phase comparison. Phase comparison is necessary to determine whether the sum and difference voltages are in phase or out of phase which depends on whether the point in the radar beam from which echo signals are returning is above or below the antenna boresight line. Sum signal voltages $E\Sigma$ pass through duplexer 26 to R.F. hybrid 5, which is identical to hybrid 2 in its operation, where the sum and phase shifted difference voltages are added and subtracted. Because the hybrid splits power evenly in its two output channels, this results in output voltages which are .707 of the level at the hybrid input. Therefore the input to the mixer 6 is .707 ($E\Sigma + jE_\Delta$) and .707 ($E\Sigma - jE_\Delta$). The relative phase of these voltages is maintained through mixer 6 where a mixing of signals from local oscillator 27 with the R.F. voltages occurs, and the difference I.F. voltage is filtered out. The difference I.F. voltage is at some I.F. frequency having the same relative phase characteristic as the R.F. input signal. The I.F. voltages then pass through I.F. preamplifiers 7 and 8 to the angle information detection channel which include limiting I.F. amplifiers 9 and 10 and phase detector 11. The limiting I.F. amplifiers have identical transfer characteristics in both phase and output level so that the phase detector output will not be affected by target area or range. The phase detector is a balanced input short delay line type. Its output is the angle deflection signal which we will call the angle off boresight (A.O.B.) signal, and it is proportional to $$\sin\theta \sin\frac{\alpha}{\Sigma}$$

where $2\theta$ is the phase angle between $\Sigma + jP\Delta$ and $\Sigma - jP\Delta$. P is an attenuation factor introduced by resistive attenuation at 4 in FIGURE 1, and $\alpha$ is the delay of the delay lines in the phase detector.

As $2\theta$ is the phase angle between $\Sigma + jP\Delta$ and $\Sigma - jP\Delta$, (1) $\quad \theta = \arctan \dfrac{P\Delta}{\Sigma}$ (2) $\quad \sin\theta = \dfrac{P\Delta}{\sqrt{\Sigma^2 + (P\Delta)^2}} = \dfrac{\dfrac{P\Delta}{\Sigma}}{\left(1+\left(\dfrac{P\Delta}{\Sigma}\right)^2\right)^{\frac{1}{2}}}$ Therefore, A.O.B. is proportional to $\dfrac{\dfrac{P\Delta}{\Sigma}}{\left[1+\left(\dfrac{P\Delta}{\Sigma}\right)^2\right]^{\frac{1}{2}}}$ so for small angles A.O.B. is proportional to $\dfrac{\Delta}{\Sigma}$ Now the vertical location, with respect to the boresight axis, of a single point target in space is characterized by a particular $\Delta/\Sigma$ ratio because of the position of the antenna feeds and operation of hybrid 2. Therefore, as the A.O.B. signal is proportional to $\Delta/\Sigma$, the A.O.B. signal represents the vertical location of the target with respect to the boresight axis. The A.O.B. signal is fed to the indicator control system 20 for amplification and application to the vertical deflection means of the indicator 21. Horizontal deflection voltage is proportional to range sweep voltage, and sweeps constantly with range sweep voltage which is synchronized with timing oscillator 22.

Referring to FIGURE 5, it is apparent that there may be some ambiguity in the ratio of $\Delta/\Sigma$ when the information from hybrid 2 lies at angles beyond the peaks M and N of the $\Delta$ function curve. In order to display only information lying within the inner sector of coverage, i.e., between P and R, FIGURE 5, the angle gate channel is provided according to our invention. The input to this channel is a portion of the output of the I.F. preamplifiers 7 and 8. The I.F. hybrid 12, in conventional manner, takes the sum and difference of its two input signals producing outputs proportional to $E_\Sigma$ and $E_\Delta$. It is not necessary to hold the differential phase shift beyond hybrid 12 to zero. The two signals are amplified by I.F. amplifiers 13 and 14 which are similar to each other and one of which, 14, can be controlled in gain. Control of the gain of 14, by control 15, has the effect of moving the $\Delta$ function of FIGURE 5 up and down with respect to the sum function. After conversion to video signals is accomplished by amplitude detectors 16 and 17, a subtraction of the difference video function from the sum video function is effected in subtracter 18. Subtracter 18 is so arranged that only positive outputs are present at its output, any negative results being clamped to zero.

To assure uniformity of the output of the angle gate channel (the angle gate signal), the subtracter output is passed through a squaring video amplifier 19, which limits the amplitude of the signal. After limiting, the signal is then applied to the indicator control system 20 for use as beam intensity modulation. When there is no angle gate signal, the beam is extinguished. It becomes apparent that if the sum and difference functions are outside the region between points P and R on FIGURE 5, the result of the subtraction in subtracter 18 is zero or negative. But it has been said that negative results would be clamped to zero. At any rate, no angle gate signal is produced so the indicator beam is extinguished. Therefore, no presentations are made on indicator 21 which are representative of obstructions outside the included angle of the radar beam equivalent to the distance between P and R in FIGURE 5. In other words, the depth of the angle gate limits the presentation on the indicator 21 to objects or terrain in the beam A of FIGURE 3 between a certain angle above the boresight line and a certain angle below the boresight line, these angles being those corresponding to the intersection of the $\Sigma$ function and the variable amplitude $\Delta$ function, points P and R, FIGURE 5. It has been said that by control of the gain of the I.F. amplifier, the difference function can be moved up and down with respect to the sum function. Obviously then, by adjusting the gain, the angles at the intersection of the functions can be varied. This results in control of the coverage of the radar beam which will be presented on the indicator.

While angle gating so far discussed has referred to both the sum and difference functions, it has been found to be possible in some circumstances to eliminate certain components of the angle gate channel and still have an angle gate giving adequate resolution. In this modification of the present invention, hybrid 12, I.F. amplifier 14, detector 17, and subtracter 18 are omitted. I.F. amplifier 13 is coupled directly to I.F. preamplifier 7, and detector 16 is coupled directly to squaring video amplifier 19.

If it is desirable to limit the indicator presentation to include obstacles only within a certain range, range gating can be employed by using range gate generator 25 coupled to phase detector 11 and to the indicator control system 20. The range gate generator 25 may be of conventional design and can be selected from the many known to those skilled in the art. One of such generators is shown in FIGURE 9.2 of volume 20 of the Radiation Laboratories Series of the Massachusetts Institute of Technology. This results in positive or negative outputs of the phase detector which are of short duration, in the order of .5 microsecond. Therefore, the requirement for the angle detection amplifier in indicator control system 20 is somewhat simplified since the gated output of the phase detector consists of pulses of the same duration for all conditions. Whether the output of the phase detector is positive or negative depends on whether echos returning during the range gate are from above or below the boresight line.

The range gate signal is applied as an intensity modulation signal to the indicator control system 20 so that the indicator shows a trace or dot only when the angle gate and range gate coincide in time, thereby avoiding indications of objects outside the desired range of presentation, which would otherwise result.

As noted above the range gate search generator 25 and the range sweep circuit in indicator control system 20 are conventional. The time duration of the sweep determines the total range which can be presented, subject, of course, to the limitation imposed by the range gate when it is used. The amplitude of the sweep determines the range per unit horizontal dimension represented on the C.R.T.

The timing oscillator 22 operates to trigger the R.F. pulse source, the range sweep circuit in the indicator control system, and the angle marker generator.

The angle marker of the present invention is developed by means of a triggered oscillator at the I.F. frequency located in angle marker generator 23. The output of generator 23 is split into two signals, $Ea_1$ and $Ea_2$, which have between them a phase angle $2\gamma$ of the same order of magnitude as the phase angle between the signals which enter the limiting I.F. amplifiers from the I.F. preamplifiers of the receiver channels. The latter phase angle is $2\theta$ where $\theta$ equals angle off boresight. Generator 23 can be adjusted so that the signals $Ea_1$ and $Ea_2$ have a phase difference $2\gamma$ equal to any desired $2\theta$. These signals are inserted into the limiting I.F. amplifiers during a time when signals from the receiver channels are not present, as will be explained below, and produce a constant phase detector output with time, provided $\gamma$ is not changed. By adjusting the generator 23, the output signal (angle marker signal) from the phase detector 11 can be made to produce deflection of the presentation appearing on the indicator 21 which represents any desired angle off boresight. In order to avoid interference of the angle marker circuit with normal system operation, the angle marker signal is generated on a time sharing basis with the regular range sweep. By using a delayed trigger, a marker sweep is effected on the indicator 21 beginning at a time after the range sweep has covered the range of the system, but before the next transmission of R.F. energy from the antenna, so that during the marker sweep no input echo signals from the antenna are received and only the angle marker signal deflects the indicator beam. The angle marker signal makes possible constant monitoring and calibration of the angle information channel, particularly the limiting I.F. amplifiers.

The "strobe" positioning input is a feature which can be added for an indication on the indicator 21 of horizontal with respect to the boresight axis. It uses, as a reference, a vertical gyro mounted to the airframe. It should be apparent that a vertical gyro may be coordinated with the adjustment of angle marker generator 20 to produce a horizontal reference on indicator 21.

While the individual components used in our invention may be conventional, it is in their combination that our invention lies and, though a particular embodiment has been described, we wish to be limited in scope only by the appended claims.

We claim:

1. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; information means for producing angle information signals representative of the angles between said axis and terrain, and between said axis and obstacles, said information means having a first hybrid coupled to said antenna means for developing from said reflected energy a sum signal proportional to the vector sum of two components of reflected energy and a difference signal proportional to the vector difference of said components, a phase shifter coupled to said first hybrid and responsive to said difference signal to displace it in phase with respect to said sum signal, a duplexer coupled to said first hybrid to transmit said sum signal and coupled to said means for providing energy for radiation, a second hybrid coupled to said phase shifter and to said duplexer to develop first and second composite signals proportional respectively to the said sum signal plus the phase displaced difference signal and the said sum signal minus the phase displaced difference signal, first and second composite signal translating channels coupled to said second hybrid each of said channels having an I.F. converter and an I.F. preamplifier coupled in cascade, and an angle information detection channel coupled to said I.F. preamplifiers said channel having a limiting I.F. amplifier coupled to each of said I.F. preamplifiers a phase detector coupled to said limiting I.F. amplifiers producing an output proportional to trigonometric functions of said angles between said axis and terrain and between said axis and obstacles an indicator control system coupled to said phase detector and an indicator coupled to said indicator control system for providing a visible presentation; gating means coupled to said information means for restricting said angle information signals produced, to those representative of terrain or obstacles existing within a desired volume of coverage of said illuminating lobe; and marker means coupled to said information means for calibration thereof.

2. The radar ranging system of claim 1 wherein the marker means comprises: angle marker generator means coupled to said means for providing energy for radiation and to said limiting I.F. amplifiers for delivering thereto I.F. signals having a known phase displacement.

3. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; information means for producing angle information signals representative of the angles between said axis and terrain, and between said axis and obstacles, said information means having a first hybrid coupled to said antenna means for developing from said reflected energy a sum signal proportional to the vector sum of two components of reflected energy and a difference signal proportional to the vector difference of said components, a phase shifter coupled to said first hybrid and responsive to said difference signal to displace it in phase with respect to said sum signal, a duplexer coupled to said first hybrid to transmit said sum signal and coupled to said means for providing energy for radiation, a second hybrid coupled to said phase shifter and to said duplexer to develop first and second composite signals proportional respectively to the said sum signal plus the phase displaced difference signal and the said sum signal minus the phase displaced difference signal, first and second composite signal translating channels coupled to said second hybrid each of said channels having an I.F. converter and an I.F. preamplifier coupled in cascade, and an angle information detection channel coupled to said I.F. preamplifiers said channel having a limiting I.F. amplifier coupled to each of said I.F. preamplifiers and a phase detector coupled to said limiting I.F. amplifiers producing an output proportional to trigonometric functions of angles between said axis and terrain and between said axis and obstacles and an indicator control system coupled to said phase detector and an indicator coupled to said indicator control system for providing a visible presentation; gating means for restricting said angle information signals produced to those representative of terrain or obstacles existing within a desired volume of coverage of said illuminating lob, said gating means having means coupled to said I.F. preamplifiers for producing voltage proportional to the said sum signal, detector means coupled to said means for producing voltage to produce a video angle gate signal, and a squaring video amplifier coupled to said detector means for limiting the amplitude of and shaping the video signal and coupled to said indicator control system to control brightness of the presentation on said indicator; and marker means coupled to said information means for calibration thereof.

4. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; information means for producing angle information signals representative of the angles between said axis and terrain, and between said axis and obstacles, said information means having a first hybrid coupled to said antenna means for developing from said reflected energy a sum signal proportional to the vector sum of two components of reflected energy and a difference signal proportional to the vector difference of said components, a phase shifter coupled to said first hybrid and responsive to said difference signal to displace it in phase with respect to said sum signal, a duplexer coupled to said first hybrid to transmit said sum signal and coupled to said means for providing energy for radiation, a second hybrid coupled to said phase shifter and to said duplexer to develop first and second composite signals proportional respectively to the said sum signal plus the phase displaced difference signal and the said sum signal minus the phase displaced difference signal, first and second composite signal translating channels coupled to said second hybrid each of said channels having an I.F. converter and an I.F. preamplifier coupled in cascade, and an angle information detection channel coupled to said I.F. preamplifiers said channel having a limiting I.F. amplifier coupled to each of said I.F. preamplifiers and a phase detector coupled to said limiting I.F. amplifiers producing an output proportional to trigonometric functions of said angles between said axis and terrain and between said axis and obstacles and an indicator control system coupled to said phase detector and an indicator coupled to said indicator control system for providing a visible presentation; gating means for restricting said angle information signals produced to those representative of terrain or obstacles existing within a desired volume of coverage of said illuminating lobe, said gating means having means coupled to said I.F. preamplifiers for producing voltages proportional to said sum signal and to said difference signal, detector means coupled to said means for producing voltages to produce video signals representative of said proportional voltages, subtracter means coupled to said detector means to subtract video signals producing a resultant video signal, and a squaring video amplifier for limiting amplitude of and shaping the resultant video signal coupled to said subtracter means and to said indicator control system to control brightness of the presentation on said indicator in response to the difference between said sum and difference signals; and marker means coupled to said information means for calibration thereof.

5. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; a first hybrid coupled to said antenna means for developing from said reflected energy a sum signal proportional to the vector sum of two components of reflected energy and a difference signal proportional to the vector difference of said components; a phase shifter coupled to said first hybrid and responsive to said difference signal to displace it in phase with respect to said sum signal; a duplexer coupled to said first hybrid to transmit said sum signal, and coupled to said means for providing energy for radiation; a second hybrid coupled to said phase shifter and to said duplexer to develop first and second composite signals proportional respectively to the said sum signal plus the phase displaced difference signal, and the said sum signal minus the phase displaced difference signal; first and second composite signal translating channels coupled to said second hybrid, each of said channels having an I.F. converter and an I.F. preamplifier coupled in cascade; an angle information detection channel coupled to said I.F. preamplifiers, said channel having a limiting I.F. amplifier coupled to each of said I.F. preamplifiers, a phase detector coupled to said limiting I.F. amplifiers producing an output proportional to trigonometric functions of said angles between said axis and terrain and between said axis and obstacles, an indicator control system coupled to said phase detector and an indicator coupled to said indicator control system for providing a visible presentation, and a range gating means coupled to said phase detector and to said indicator control system to restrict phase detector output to signals of short duration and to control appearance of said presentation; angle gating means coupled to said I.F. preamplifiers and to said indicator control system for restricting phase detector output to signals representative of terrain or obstacles existing within a desired volume of coverage of said illuminating lobe; and marker means coupled to said limiting I.F. amplifiers for calibration.

6. The radar ranging system of claim 5 wherein the angle gating means comprises: means coupled to said I.F. preamplifiers for producing voltage proportional to said sum signal; detector means coupled to said means for producing voltage to produce a video angle gate signal; a squaring video amplifier coupled to said detector means for limiting the amplitude of and shaping the video signal and coupled to said indicator control system to cooperate with said range gating means controlling the appearance of said presentation.

7. The radar ranging system of claim 5 wherein the angle gating means comprises: means coupled to said I.F. preamplifiers for producing voltages proportional to said sum signal and to said difference signal; detector means coupled to said means for producing voltages to produce video signals representative of said proportional voltages; subtracter means coupled to said detector means to subtract video signals producing a resultant video signal; and a squaring video amplifier for limiting amplitude of and shaping the resultant video signal, coupled to said subtracter means and to said indicator control system to produce in said indicator control system a signal responsive to the difference between said sum and difference signals for cooperation with said range gating means in controlling the appearance of said presentation.

8. The radar ranging system of claim 5 wherein the marker means comprises: angle marker generator means coupled to said limiting I.F. amplifiers for delivering thereto I.F. signals having a known phase displacement.

9. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; a first hybrid coupled to said antenna means for developing from said reflected energy a sum signal proportional to the vector sum of two components of reflected energy and a difference signal proportional to the vector difference of said components; a phase shifter coupled to said first hybrid and responsive to said difference signal to displace it in phase with respect to said sum signal; a duplexer coupled to said first hybrid to transmit said sum signal, and coupled to said means for providing energy for radiation; a second hybrid coupled to said phase shifter and to said duplexer to develop first and second composite signals proportional respectively to the said sum signal plus the phase displaced difference signal, and the said sum signal minus the phase displaced difference signal; first and second composite signal translating channels coupled to said second hybrid, each of said channels having an I.F. converter and an I.F. preamplifier coupled in cascade; an angle information detection channel coupled to said I.F. preamplifiers, said channel having a limiting I.F. amplifier coupled to each of said I.F. preamplifiers, a phase detector coupled to said limiting I.F. amplifiers producing an output proportional to trigonometric functions of said angles between said axis and terrain and between said axis and obstacles, an indicator control system coupled to said phase detector and an indicator coupled to said indicator control system for providing a visible presentation; an angle gating means having means coupled to said I.F. preamplifiers for producing voltage proportional to said sum signal, detector means coupled to said means for producing voltage, to produce a video angle gate signal, and a squaring video amplifier coupled to said detector means for shaping the video signal and coupled to said indicator control system to control brightness of the presentation on said indicator; and angle marker generator means coupled to said means for providing energy for radiation and to said limiting I.F. amplifiers for delivering thereto I.F. signals having a known phase displacement.

10. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; a first hybrid coupled to said antenna means for developing from said reflected energy a sum signal proportional to the vector sum of two components of reflected energy and a difference signal proportional to the vector difference of said components; a phase shifter coupled to said first hybrid and responsive to said difference signal to displace it in phase with respect to said sum signal; a duplexer coupled to said first hybrid to transmit said sum signal, and coupled to said means for providing energy for radiation; a second hybrid coupled to said phase shifter and to said duplexer to develop first and second composite signals proportional respectively to the said sum signal plus the phase displaced difference signal, and the said sum signal minus the phase displaced difference signal; first and second composite signal translating channels coupled to said second hybrid, each of said channels having an I.F. converter and an I.F. preamplifier coupled in cascade; an angle information detection channel coupled to said I.F. preamplifiers, said channel having a limiting I.F. amplifier coupled to each of said I.F. preamplifiers, a phase detector coupled to said limiting I.F. amplifiers producing an output proportional to trigonometric functions of said angles between said axis and terrain and between said axis and obstacles, an indicator control system coupled to said phase detector and an indicator coupled to said indicator control system for providing a visible presentation; an angle gating means having means coupled to said I.F. preamplifiers for producing voltage proportional to said sum signal and to said difference signal, detector means coupled to said means for producing voltages to produce video signals representative of said proportional voltages, subtracter means coupled to said detector means to subtract video signals producing a resultant video signal, and a squaring video amplifier for limiting the amplitude of and shaping the resultant video signal coupled to said subtracter means and to said indicator control system to control brightness of the presentation on said indicator in response to the difference between said sum and difference signals; and angle marker generator means coupled to said means for providing energy for radiation and to said limiting I.F. amplifier for delivering thereto I.F. signals having a known phase displacement.

11. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; a first hybrid coupled to said antenna means for developing from said reflected energy a sum signal proportional to the vector sum of two components of reflected energy and a difference signal proportional to the vector difference of said components; a phase shifter coupled to said first hybrid and responsive to said difference signal to displace it in phase with respect to said sum signal; a duplexer coupled to said first hybrid to transmit said sum signal, and coupled to said means for providing energy for radiation; a second hybrid coupled to said phase shifter and to said duplexer to develop first and second composite signals proportional respectively to the said sum signal plus the phase displaced difference signal, and the said sum signal minus the phase displaced difference signal; first and second composite signal translating channels coupled to said second hybrid, each of said channels having an I.F. converter and an I.F. preamplifier coupled in cascade; an angle information detection channel coupled to said I.F. preamplifiers, said channel having a limiting I.F. amplifier coupled to each of said I.F. preamplifiers, a phase detector coupled to said limiting I.F. amplifiers producing an output proportional to trigonometric functions of said angles between said axis and terrain and between said axis and obstacles, an indicator control system coupled to said phase detector and an indicator coupled to said indicator control system for providing a visible presentation, and a range gating means coupled to said phase detector and to said indicator control system to restrict phase detector output to signals of short duration and to control appearance of said presentation; angle gating means having means coupled to said I.F. preamplifiers for producing voltage proportional to said sum signal, detector means coupled to said means for producing voltage to produce a video angle gate signal, and a squaring video amplifier coupled to said detector means for limiting the amplitude of and shaping the video signal and coupled to said indicator control system to cooperate with said range gating means controlling the appearance of said presentation; and angle marker generator means coupled to said limiting I.F. amplifiers for delivering thereto I.F. signals having a known phase displacement.

12. In an aircraft, a radar ranging system of the monopulse phase comparison type for terrain clearance and obstacle detection comprising: directional antenna means fixed to the aircraft alternately providing an illuminating lobe of radiated energy, said lobe having an axis parallel to the air mass velocity vector of the aircraft, and receiving reflected energy from obstacles and terrain; means coupled to said antenna means for providing energy for radiation; a first hybrid coupled to said antenna means for developing from said reflected energy a sum signal proportional to the vector sum of two components of reflected energy and a difference signal proportional to the vector difference of said components; a phase shifter coupled to said first hybrid and responsive to said difference signal to displace it in phase with respect to said sum signal; a duplexer coupled to said first hybrid to transmit said sum signal, and coupled to said means for providing energy for radiation; a second hybrid coupled to said phase shifter and to said duplexer to develop first and second composite signals proportional respectively to the said sum signal plus the phase displaced difference signal, and the said sum signal minus the phase displaced difference signal; first and second composite signal translating channels coupled to said second hybrid, each of said channels having an I.F. converter and an I.F. preamplifier coupled in cascade; an angle information detection channel coupled to said I.F. preamplifiers, said channel having a limiting I.F. amplifier coupled to each of said I.F. preamplifiers, a phase detector coupled to said limiting I.F. amplifiers producing an output proportional to trigonometric functions of said angles between said axis and terrain and between said axis and obstacles, an indicator control system coupled to said phase detector and an indicator coupled to said indicator control system for providing a visible presentation, and a range gating means coupled to said phase detector and to said indicator control system to restrict phase detector output to signals of short duration and to control appearance of said presentation; angle gating means having means coupled to said I.F. preamplifiers for producing voltages proportional to said sum signal and to said difference signal, detector means coupled to said means for producing voltages to produce video signals representative of said proportional voltages, subtracter means coupled to said detector means to subtract video signals producing a resultant video signal, and a squaring video amplifier for limiting amplitude of and shaping the resultant video signal coupled to said subtracter means and to said indicator control system to produce in said indicator control system a signal responsive to the difference between said sum and difference signals for cooperation with said range gating means in controlling the appearance of said presentation; and angle marker generator means coupled to said limiting I.F. amplifiers for delivering thereto I.F. signals having a known phase displacement.

References Cited in the file of this patent
UNITED STATES PATENTS

| | | |
|---|---|---|
| 2,608,683 | Blewett | Aug. 26, 1952 |
| 2,682,656 | Phillips | June 29, 1954 |
| 2,784,400 | Ehrenfried | Mar. 5, 1957 |